Feb. 28, 1961 H. W. LENSNER 2,973,457

CARRIER RELAYING SYSTEM

Filed Aug. 27, 1958 4 Sheets-Sheet 1

Feb. 28, 1961 H. W. LENSNER 2,973,457

CARRIER RELAYING SYSTEM

Filed Aug. 27, 1958 4 Sheets-Sheet 4

2,973,457
Patented Feb. 28, 1961

1

2,973,457

CARRIER RELAYING SYSTEM

Herbert W. Lensner, East Orange, N.J., assignor to Westinghouse Electric Corporation, East Pittsburgh, Pa., a corporation of Pennsylvania Filed Aug. 27, 1958, Ser. No. 757,517

6 Claims. (Cl. 317—27)

This invention relates to a protective relaying system, and it has particular relation to a transmission-line, relay-protection system employing carrier current.

In distance-relaying systems employing carrier current, it has been the practice to divide a protected system into three parts or zones, each of which has separate relaying protection. The distance-relay element for the third zone is employed for starting the generation of carrier current for blocking purposes in the event that the fault to which the relay element responds is an external fault for the protected zone. At the same time, the relay element initiates the measurement of a timing interval in order to provide backup relay protection.

Positive production of carrier current at the required time is of paramount importance. Under certain conditions, the production of carrier current and the measurement of the timing interval must be both initiated. Under certain circumstances, carrier current is to be generated without initiating the measurement of the timing interval.

If a moving contact is employed in the relay element which controls the starting of carrier current, the carrier-current production must be completely independent of contact bounce and vibration. Furthermore, the relay element must have high sensitivity, and for this reason, and to assure positive operation, a simple contact structure is highly desirable.

The control circuit for controlling the production of carrier current should be of simple and economical construction. Preferably, a single control circuit should be provided.

In accordance with the invention, the production of carrier current is initiated by an interruption of a current-carrying condition, such as that produced by the opening of control contacts. The control circuit is so designed that if mechanically-operated contacts are employed for control purposes a single movable contact suffices for the relay element. In a preferred embodiment of the invention, a single carrier control circuit is employed for all carrier stop and start functions. Test facilities are provided which test the entire control circuit employed for controlling the production of carrier current.

My invention is particularly suitable for a compensator relaying system similar to that disclosed in the Sonnemann patent application, Serial No. 685,155 and in the Goldsborough patent application, Serial No. 685,168, both filed September 20, 1957.

It is, therefore, an object of the invention to provide a simplified and improved transmission-line protection system employing carrier current.

It is a further object of the invention to provide a transmission-line protection system employing carrier current wherein a single control circuit is employed for all stopping and starting of carrier-current production.

It is an additional object of the invention to provide a transmission-line protection system employing carrier current wherein a single movable contact on a relay element suffices for both carrier-current and timing control functions.

2

With the foregoing and other objects in view, my invention consists in the apparatus, circuits, combinations and methods of operation, hereinafter described and claimed and illustrated in the accompanying drawing, wherein:

Figure 1 is a diagrammatic view of the best form of embodiment of circuits and apparatus, which I at present prefer for embodying my invention in a non-carrier relaying equipment for protecting one terminal of a three-phase power-line against faults involving either two or three phases of the line;

Figs. 2A and 2B together constitute a diagrammatic view showing circuits and apparatus in the best form of embodiment which I at present contemplate for embodying my invention in the relaying equipment which is provided at one relaying terminal in a complete carrier-current relaying system for the complete protection of a power-system, including protection against ground-faults as well as all kinds of phase-faults;

Figure 1:
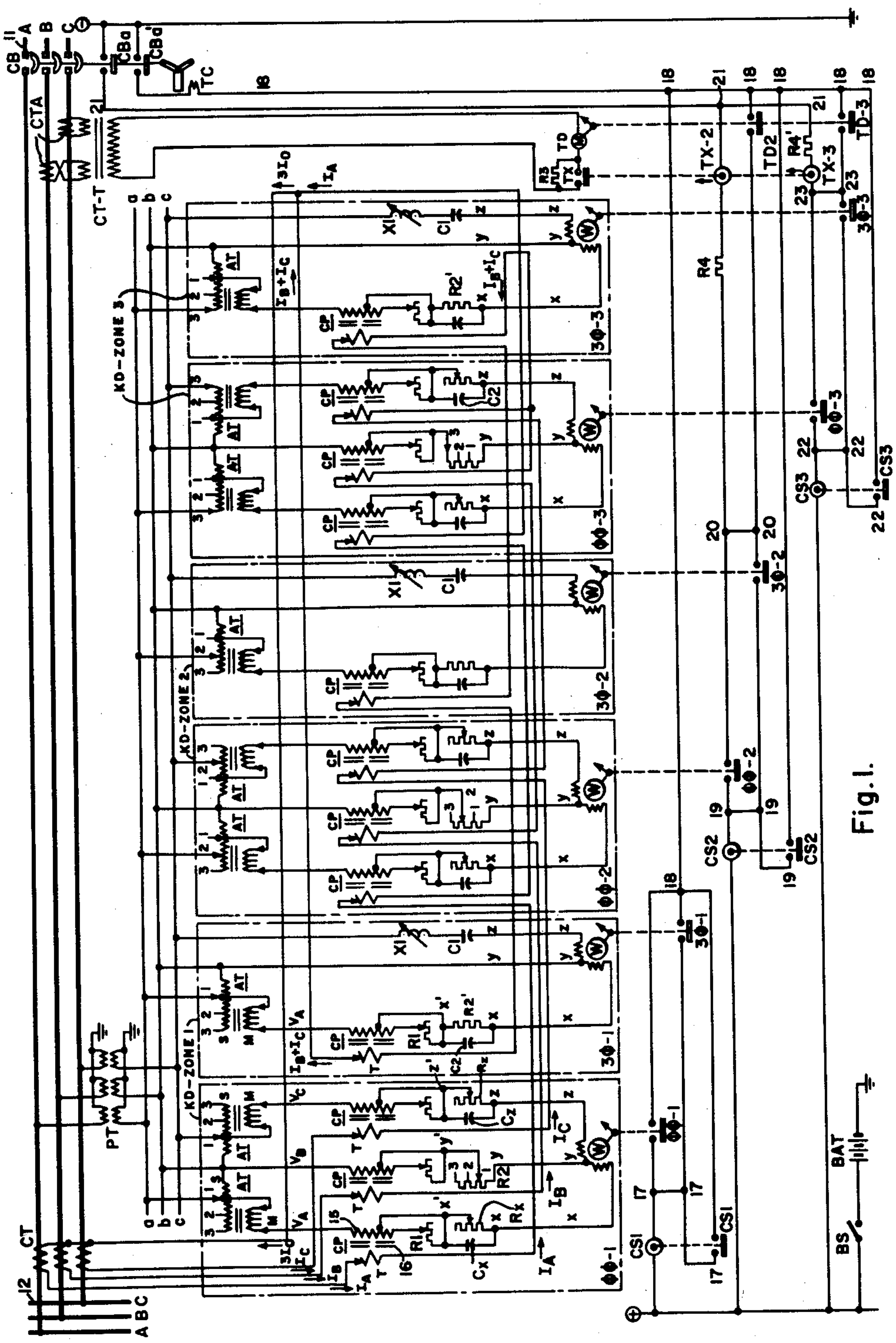

In Fig. 1, I show a compensator relaying system, applied for the protection of a three-phase line-section 11, which is connected to a three-phase bus 12, at the relaying station, through a circuit breaker CB. A set of line-current transformers CT derive the line-currents $I_A$, $I_B$, $I_C$ and the star-point current $3I_O$ for relaying purposes, where $I_O$ is the zero-sequence component of the line-currents. A set of potential transformers PT is used for deriving the line or bus-voltages *a*, *b* and *c* for relaying purposes.

In Fig. 1, I show six relaying-units which I call Type KD units, two for each of the three zones of protection, namely, a phase-fault unit $\phi\phi$ for responding to all kinds of double-line faults, and a three-phase unit $3\phi$ for responding to three-phase faults, for each zone, the zones being indicated by appended numbers, such as the designation $\phi\phi$–1 for the first-zone phase-fault unit or element. I also show a time-delay element or timer TD, an auxiliary timer-starting relay TX, and three contactor-switches CS1, CS2 and CS3. The contacts of the circuit breaker CB and the various relay-elements are shown in their deenergized positions, and are regarded as being raised by the operation of the respective elements. The physical connections between the various relay-contacts and the various operating-coils of the respective relays are shown as dotted vertical stems, which are intended as a convention for indicating the mechanical connection between the parts of each relay-element. As a further convention, the same legends are applied, both to the force-producing or operating-member, and to the contact-members of each relay-element, to denote their relationship. The timer TD has two contacts, which are distinguished as TD2 and TD3, which close after different time-delays suitable for the second-zone and third-zone relays, respectively.

Each of the six illustrated relaying-units operates on compensated voltages. Since the amount of the mutual compensator-impedance, which is required in the alternating-current relaying circuits, is directly proportional to the value of the derived bus-voltage which is used in said relaying circuits, I have shown, in Fig. 1, a convenient means for aiding in adjusting the effective impedance-value of each compensator, by adjusting the value of the derived bus-voltage which is applied to the relaying circuits. To this end, I show a plurality of autotransformers AT, each having three adjustable primary-connection taps numbered 1, 2 and 3 on each main autotransformer-winding S. The secondary or output circuit of each autotransformer in Fig. 1 is permanently connected to the tap S1, and this secondary circuit serially includes some fine-adjustment taps on a tertiary winding M of the autotransformer which can add or subtract small fractional increments to the secondary voltage, according to the polarity of the connections to the M-taps. The output-circuit of the tertiary autotransformer-winding M produces the effective bus-voltage which is used in that phase of the relaying circuit.

In Fig. 1, each of the compensators CP is provided with a tapped primary winding T, having a small number of turns, and a secondary winding 15, having a large number of turns, these two windings being magnetically interlinked through an air-gapped core 16 so that the compensator-voltage which is generated in the secondary winding 15 will be substantially 90° or less, out of phase with the current which traverses the primary winding T, depending upon the amount of effective resistance R1. The provision of the air gap is desirable for the reason that the air gap compensator provides an effective transient shunt which tends to remove any direct-current transient from the energy supplied to the relays. The relays herein described are remarkably free of direct-current transient response.

The taps of the primary winding T of each compensator CP are numbered in various ohm-values which are so chosen that a correct replica of the positive-sequence line-impedance $Z_{BP}$ of the protected line 11, to a distance as far as the desired balance-point of the relay, will be obtained when $$Z_{BP}=\frac{TS}{(1\pm M)}$$

where T, S and M are the numbers or fractional numbers which are marked on the chosen taps of the compensator-primary T, the main autotransformer-winding S, and the tertiary autotransformer-winding M, respectively. In this manner, I provide a very convenient means for setting the mutual impedance of the compensator to have an ohmic value which matches the line-impedance of any given line 11 at any balance-point distance from the relaying station, at which it is desired for the relay to have a zero response or a balance-point. While this particular type of balance-point compensator-adjustment is preferred, I am, of course, not limited altogether thereto.

It will be subsequently explained that, for the best results, the impedance-angle of the compensator-impedance should match the impedance-angle of the particular transmission line 11 which is being protected. In accordance with an invention which is described and claimed in an application of Howard J. Calhoun, Serial No. 685,167, filed September 20, 1957, Fig. 1 shows a preferred way to adjust the phase-angle relation between the primary current of each compensator and its secondary voltage, without using large values of resistance, and without causing much change in the mutual impedance or the output-voltage of the compensator as a result of changes in the angle-adjustments. To this end, a small percentage of the total number of turns of the secondary winding 15 of each compensator CP are shorted through a variable resistance R1, which can be varied from $R1=0$, to provide a minimum impedance-angle, to $R1=600$ ohms, to provide a maximum impedance-angle of approximately 85° (for example); or the resistance R1 may be infinity, or an open circuit, to provide an impedance-angle of substantially 90°. The combination of a small value of resistance R1 and few shorting turns on the secondary winding 15 not only reduces the compensator-burden, but it also results in a minimum change in the mutual impedance when the value of the resistance R1 is changed for the purpose of adjusting the compensator for lines of different impedance-angles. This provides the best means which has heretofore been devised for accomplishing this purpose.

Referring, now, to the phase-fault units φφ–1, φφ–2 and φφ–3 of the three zones, 1, 2 and 3, of the non-carrier Type KD relaying system shown in Fig. 1, each unit uses three identical compensators CP, connected in series with the respective open-delta voltage-terminals $V_A$, $V_B$ and $V_C$ which are supplied by two autotransformers AT. One of these two autotransformers AT has its primary connection across the delta phase *ba* of the potential-transformer bus *abc*, while the other autotransformer has its primary connection across the delta phase *bc*. The three phase-fault relay-units φφ–1, φφ–2 and φφ–3, are designed to respond to line-to-line faults and to double-line-to-ground faults. Said units are all alike, except for their different distance-settings, or the different impedance-settings of their compensators CP, as indicated by the choice of the S-taps 1, 2 and 3, respectively, for the first, second and third zones, as shown in Fig. 1.

The output-circuits of the two autotransformers AT of each phase-fault relay-unit, such as the unit φφ–1, thus provide an adjustable three-phase derived bus-voltage $V_A$, $V_B$, $V_C$. The primary windings T of the three compensators CP of each of these phase-fault units, such as φφ–1, are energized from the respective derived line-currents $I_A$, $I_B$ and $I_C$ which are supplied by the line-current transformers CT. The three compensators CP subtract their respective compensator-voltages from the corresponding phases of the derived bus-voltages $V_A$, $V_B$ and $V_C$, producing a three-phase compensated voltage at the points $x'$, $y'$ and $z'$ as shown for the relay-unit φφ–1 in Fig. 1.

The compensated voltages $x'$, $y'$ and $z'$ of each phase-fault relaying-unit, such as φφ–1 in Fig. 1, are used to energize a suitable type of relay, such as a torque-producing relaying element which produces no torque at all (that is, it has a balance-point), when the positive and negative-sequence components of the impressed three-phase voltages $x'$, $y'$, $z'$ are equal to each other (which is the case when the voltage-triangle has collapsed to a single line or phase), or when said voltage-triangle has completely collapsed to a point. Said torque-producing relay-element has an actuating torque when the negative-sequence voltage-component predominates, while it has a restraining or non-actuating torque when the positive-sequence component predominates. Any suitable torque-producing element which answers this basic description will suffice, whether it is a balanced element, like a three-phase induction motor, in which the internal impedances and angular spacings of the element are alike in each phase, or whether said torque-producing element is an unbalanced element, such as a two-circuit element, the two circuits of which are energized from different voltages derived from the impressed three-phase voltages $x'$, $y'$, $z'$.

There are advantages in using a two-circuit torque-producing element, as diagrammatically indicated by the watt-meter type of single-phase relay-element W in each of the six relaying units φφ–1, 3φ–1, φφ–2, 3φ–2, φφ–3 and 3φ–3 as diagrammatically indicated in Fig. 1. There are various ways in which the two circuits for each of these torque-producing elements may be energized, from any two differing voltages which may be derived from different phases of the three-phase compensated voltages, such as $x'$, $y'$, $z'$ of Fig. 1.

In the particular circuit-connections which are shown for φφ–1 relay-unit in Fig. 1, the two-circuit torque-producing element W was one winding-circuit *xy* energized across the delta-phase $x'y'$ of the compensated three-phase voltages $x'y'z'$, while its other winding-circuit *zy* is energized across the delta-voltage phase $z'y'$. If the circuit-connections to and within the two-circuit torque-producing element W are such that no zero-sequence currents can flow in this element, as in the connections shown for the $\phi\phi$–1 unit in Fig. 1, then the torque-producing element will have no hybrid, balance-point-shifting responses to the product of the zero and positive-sequence relay-currents or to the product of the zero and negative-sequence relay-currents.

As described and claimed in the aforesaid Calhoun application, it is desirable, for best operation, in the phase-fault units, such as $\phi\phi$–1 of Fig. 1, to balance both the steady-state and the transient impedance-angles in the three circuits leading up to the common connection *y* of the wattmeter-element terminals *xyz*. This refers to the impedances which are connected between the bus-voltage terminal *a* and the relay-terminal *y*, the impedances which are connected between the bus-voltage terminal *b* and the relay-terminal *y*, and the impedances which are connected between the bus-voltage terminal *c* and the relay-terminal *y*.

As described and claimed in the aforesaid Calhoun application, the impedance-angles in these three circuits are kept substantially equal, notwithstanding the angle-changes which are introduced by changing the primary taps S1, S2 and S3 on the autotransformers AT, by introducing a resistance R2 in circuit between the points *y'* and *y*, and providing this resistance R2 with three taps, also numbered 1, 2 and 3, which are changed simultaneously with the S-taps of the autotransformers. Dissimilar transient effects, due to sudden bus-voltage changes in the three circuits *ay*, *by* and *cy*, are compensated for by serially including capacitors $C_x$ and $C_z$ between the points *x'* and *x* and between the points *z'* and *z*, respectively to compensate for the inductive reactances in these circuits. The effective values of these angle-adjustment capacitors $C_x$ and $C_z$ are adjustable by means of parallel-connected adjustable resistances $R_x$ and $R_z$, respectively.

These transient-suppressing circuit-portions ($C_xR_x$), R2 and ($C_zR_z$) balance the phase-angles of the impedances of the three circuits *ay*, *by* and *cy*, with open primaries on the three compensators CP. Thus, when a close-in phase-to-phase fault occurs, behind the current transformers CT, one of the delta bus-voltages $V_{AB}$, $V_{BC}$, or $V_{CA}$ is collapsed to zero. If we assume the extreme system-condition of no back-feed current over the line which is being protected, the compensators do nothing to alter this collapsed voltage. Under this condition, there should be no spurious torque in the relay to cause it to respond incorrectly. These transient-suppressing elements prevent such spurious response as might otherwise be occasioned by the sudden change in the bus-voltages in the extreme case in which there may be no current in the primaries of the copensators.

Fig. 1 also shows three three-phase-fault-responsive relays $3\phi$–1, $3\phi$–2 and $3\phi$–3, one for each of the three zones. These particular relays embody the basic concept of an invention of S.L. Goldsborough, as described and claimed in his application Serial No. 685,168, filed September 20, 1957. These three three-phase relays are all alike, except for their distance-settings which are changed in much the same manner as has been described for the phase-fault relays $\phi\phi$–1, $\phi\phi$–2, $\phi\phi$–3, so that a description of one, say the three-phase element $3\phi$–1, will suffice for all.

A principal characteristic feature of this three-phase fault-responsive relay $3\phi$–1, as distinguished from the phase-to-phase fault-responsive relay $\phi\phi$–1, is that the three-phase relay $3\phi$–1 uses only a single compensator CP, which has 1.5 times the effective mutual impedance of each of the three compensators CP which are used in the phase-fault relay $\phi\phi$–1. The phase in which this single compensator CP is connected, in the relay-unit $3\phi$–1 of Fig. 1, is designated as phase A. This three-phase unit $3\phi$–1 uses a single autotransformer AT, which is similar to the autotransformers which have been described for the phase-fault relay $\phi\phi$–1. This single autotransformer AT is connected between the phases *b* and *a* of the relaying bus *abc*, so as to provide the adjustable voltage $V_A$, which is phase A of the three-phase bus-voltages which are used for energizing the torque-producing element W of this three-phase unit $3\phi$–1, the other two bus-voltage phases being the phases *b* and *c*, unchanged.

In the three-phase unit $3\phi$–1, the single compensator CP has its secondary winding 15, with some of its turns shorted through a mutual-impedance angle-controlling resistor R1, connected in series with the bus-voltage terminal $V_A$, to produce the compensated voltage *x'*, as described for the phase-fault relay $\phi\phi$–1, remembering that the compensator CP in the three-phase relay $3\phi$–1 has an impedance-setting which is 1.5 times as high as in the phase-fault relay $\phi\phi$–1.

In the case of the three-phase relay $3\phi$–1 which is shown in Fig. 1, the compensator-primary T is traversed by the current $-(I_B+I_C)$, which is equal to $(I_A-3I_O)$, where $I_O$ is the zero-sequence component of the line-current, as derived by the current-transformers CT, as described and claimed in an application of J. G. Chevalier, Serial No. 685,277, filed September 20, 1957.

The cylinder-unit W, which is used in the three-phase relay-element $3\phi$–1 in Fig. 1, is basically a two-phase induction motor which produces torque in a direction which is determined by the phase-angle between the two voltages, and in a magnitude which is responsive to the product of the two voltages which are impressed upon the torque-producing element multiplied by the sine of the phase-angle between the two voltages. When a three-phase fault occurs close to the bus 12 at the relaying terminal of the protected line 11, all of the delta voltages of the bus will collapse to zero. And since the three-phase element $3\phi$–1 uses only one compensator CP, there will be a voltage *x'* in only one phase of the three-phase voltages which are supplied to the torque-producing cylinder-unit W, this phase being the phase which contains the compensator CP. This provides energization for the phase-winding *xy* of the torque-element W. However, the energization for the other phase-winding *zy* of the torque-element collapses to zero, in response to a three-phase line-fault near the bus, which means that the torque-element, if it responded at all under such conditions, would have only a momentary transient response, as a result of its memory-action as the uncompensated *zy* voltage is collapsing to zero.

In order that the three-phase fault-responsive unit $3\phi$–1 may react, with accuracy or intelligence, to a three-phase line-fault close to the relaying station 12, it is desirable not only to sustain a sufficient magnitude of the uncompensated bus-voltage *zy* which is applied to the torque-producing element, so that there can be a sufficient torque to operate the relay, but also to sustain or maintain the proper phase-angle between the two relay-voltages *xy* and *zy*, long enough for the relay to react at all, and to know in which direction to react, because the relay-torque is determined by the product of the magnitudes of the impressed voltages, multiplied by the sine of the phase-angle between these two voltages.

As described and claimed in the previously mentioned Calhoun application, the uncompensated *zy* voltage on the torque-element W of the three-phase unit $3\phi$–1 is sustained, for a sufficiently long time, by a memory-circuit comprising a serially connected capacitor C1 and an adjustable choke-coil X1, connected in series between the bus-terminal *c* and the terminal *z* of the torque-producing element W. It is necessary that the duration or decrement of the memory-action of this memory-circuit C1, X1 shall be sufficiently long to enable the torque-element to produce any torque at all by the end of the time within which said torque-element must accurately respond, but it is also necessary that the tuning of the circuit which includes the memory-circuit C1, X1 shall be substantially equal to the line-frequency of the protected line 11, so that the oscillating current in this tuned circuit will not get much out of phase with the corresponding line-frequency current, during the number of line-frequency cycles during which it is necessary for the torque-element to respond, with a positive torque for faults in front of the relaying station, or with a negative torque for faults behind the relaying station.

However, the introduction of the capacitor C1 of the memory-circuit, in the relaying unit 3φ–1 of Fig. 1, necessarily introduces a transient disturbance, which is suppressed or compensated for, in accordance with the Calhoun invention, by connecting a second capacitor C2 between the points $x'$ and $x$, in the compensated-voltage phase $x$ of said torque-element 3φ–1 of Fig. 1, this second capacitor C2 being shunted by a resistor R2′ which not only enhances the effect of the capacitor C2, but also enables said capacitor to suppress transients with as little memory-action as possible.

The relaying equipment which is shown in Fig. 1 requires a timer, such as TD, which is available whenever there is a line-fault involving at least two of the line-phases. While I am not limited as to exact details, I prefer to use a single-phase timer TD, which receives an energizing current whenever a fault-current is flowing, involving at least two of the line-phases. By way of example, I have shown the timer TD as being a motor-element M which is energized from the secondary winding of a saturable many-turn current-transformer CT–T, which in turn has two primary windings connected to current transformers CTA to be energized, for example, respectively by the line-currents $I_B$ and $I_C$. The primary windings are connected to supply a resultant energization to the transformer which is responsive to the difference between the line currents $I_B$ and $I_C$.

The timer-motor TD is connected in series with the normally open make-contact TX of an auxiliary timer-relay TX. This make-contact TX is bypassed by a resistance R3, which is sufficiently small to avoid substantially open-circuiting the current-transformer CT—T when said contact TX is open, but the resistance R3 is sufficiently large to prevent the timer TD from operating when said resistance is connected in series with it.

The six fault-responsive elements of Fig. 1 have correspondingly numbered make-contacts φφ–1, 3φ–1, φφ–2, 3φ–2, φφ–3 and 3φ–3, which are used to control certain relaying-circuits which are shown as being energized from a positive direct-current bus (+).

The first circuit which is connected to the positive bus (+) in Fig. 1 is a first-zone tripping-circuit which includes the operating-coil of a contactor-switch CS1, then a circuit 17, then the make contact φφ-1 of the first-zone phase-fault unit φφ–1, then a tripping-circuit 18, which extends up through the trip-coil TC of the circuit breaker CB, and finally through an auxiliary circuit-breaker make-contact CB*a′* to a negative bus (−), the circuit-breaker make-contact CB*a′* being closed when the circuit breaker CB is closed, the circuits being illustrated, however, with all switches and relays open or deenergized. Two branch-circuits are also provided between the points 17 and 18 of the first-zone protective-relaying equipment, these two branch circuits including, respectively, the make-contact 3φ–1 of the first-zone three-phase unit 3φ–1, and the make-contact CS1 of the contactor-switch CS1.

A second-zone relaying-circuit is next shown in Fig. 1, extending from the positive bus (+) through the energizing-coil CS2 of a second contactor-switch CS2, then to a circuit 19, then through the make-contact φφ–2 of the second-zone phase-fault unit φφ–2 to a circuit 20, then through a resistor R4 and through an operating-coil TX–2 of the auxiliary timer-relay TX to a circuit 21, which extends up through an auxiliary make-contact CB*a* of the circuit breaker CB, and thence to the negative bus (−). The two circuits 19 and 20 are joined also by a branch-circuit which includes the make-contact 3φ–2 of the second-zone three-phase unit 3φ–2. Consequently, the circuit 20 is energized as a result of the response of either one of the two second-zone units φφ–2 or 3φ–2. This circuit 20 thus energizes the auxiliary timer-relay TX, which initiates the movement of the timer TD, whenever there is a line-fault which activates either one of the second-zone relays.

The aforesaid circuit 20 is also used to trip the circuit breaker CB at the end of a predetermined time which is determined by the closure of the second-zone contact TD2 of the timer TD, which thereupon energizes the trip-circuit 18 from the circuit 20. The TX coil TX–2, either because of its built-in resistance, or because of an externally connected resistance R4 does not draw sufficient current from the circuit 20 to pick up the second contactor-switch CS2, but the trip-coil TC draws a very heavy current as soon as the second-zone timer-contact TD2 closes, thus causing the second contactor-switch CS2 to pick up and close its make-contact CS2, which completes a circuit-connection between the circuits 19 and 18, thus sealing-in the second-zone tripping-response.

A third relaying-circuit is connected, in Fig. 1, from the positive bus (+) through the operating-coil of a third contactor-switch CS3, then to a circuit 22, then to two branch-circuits, one extending from the circuit 22 through the make-contact φφ–3 of the third zone phase-fault unit φφ–3 to a circuit 23, the second branch-circuit extending from the circuit 22 through a make-contact 3φ–3 of the third-zone three-phase unit 3φ–3 to said circuit 23. From the circuit 23, a first branch-circuit continues through a second opearting-coil TX–3 of the auxiliary timer-relay TX, the resistor R4′, and thence to the circuit 21, so that the auxiliary timer-relay TX will initiate the movement of the timer TD whenever there is a line-fault which activates either one of the third-zone relays.

A second branch-circuit of the circuit 23 is provided, to make connection to a third-zone timer-contact TD3 which closes after a longer time-interval than is required for the closure of the second-zone contact TD2 of the timer TD. The third-zone timer-contact TD3 energizes the trip-circuit 18 from the circuit 23, and when this happens, the third contactor-switch CS3 is energized, picking up its make-contact CS3, and closing a circuit-connection between the conductors 22 and 18.

At the bottom of Fig. 1, the positive bus (+) is shown as being energized, through a battery-switch BS, from the positive terminal of a battery BAT, the negative terminal of which is grounded, to connect with the grounded negative bus (−).

My invention is particularly suitable for transmission-line protection-systems using carrier-current. Such a carrier system is shown, by way of example, in a preferred form of embodiment, in Figs. 2A and 2B. The equipment shown in Figs. 2A and 2B agrees with Fig. 1 to the extent of using the same circuit breaker CB, current-transformers CT, potential-transformers PT, first and second-zone elements φφ–1, 3φ–1, φφ–2 and 3φ–2, and timer TD, as in Fig. 1. In addition, the apparatus in Figs. 2A and 2B includes an auxiliary timer-relay TX which is the same as in Fig. 1 with two operating-coils TX–2 and TX–3, the first coil TX–2 for operating the timer-relay in response to second zone faults involving more than a single line-phase, and the second coil TX–3 for operating the timer-relay in response to third-zone faults involving more than one line-phase. The system shown in Figs. 2A and 2B differs from Fig. 1 in including certain different equipment, which will now be described.

Figure 2A:
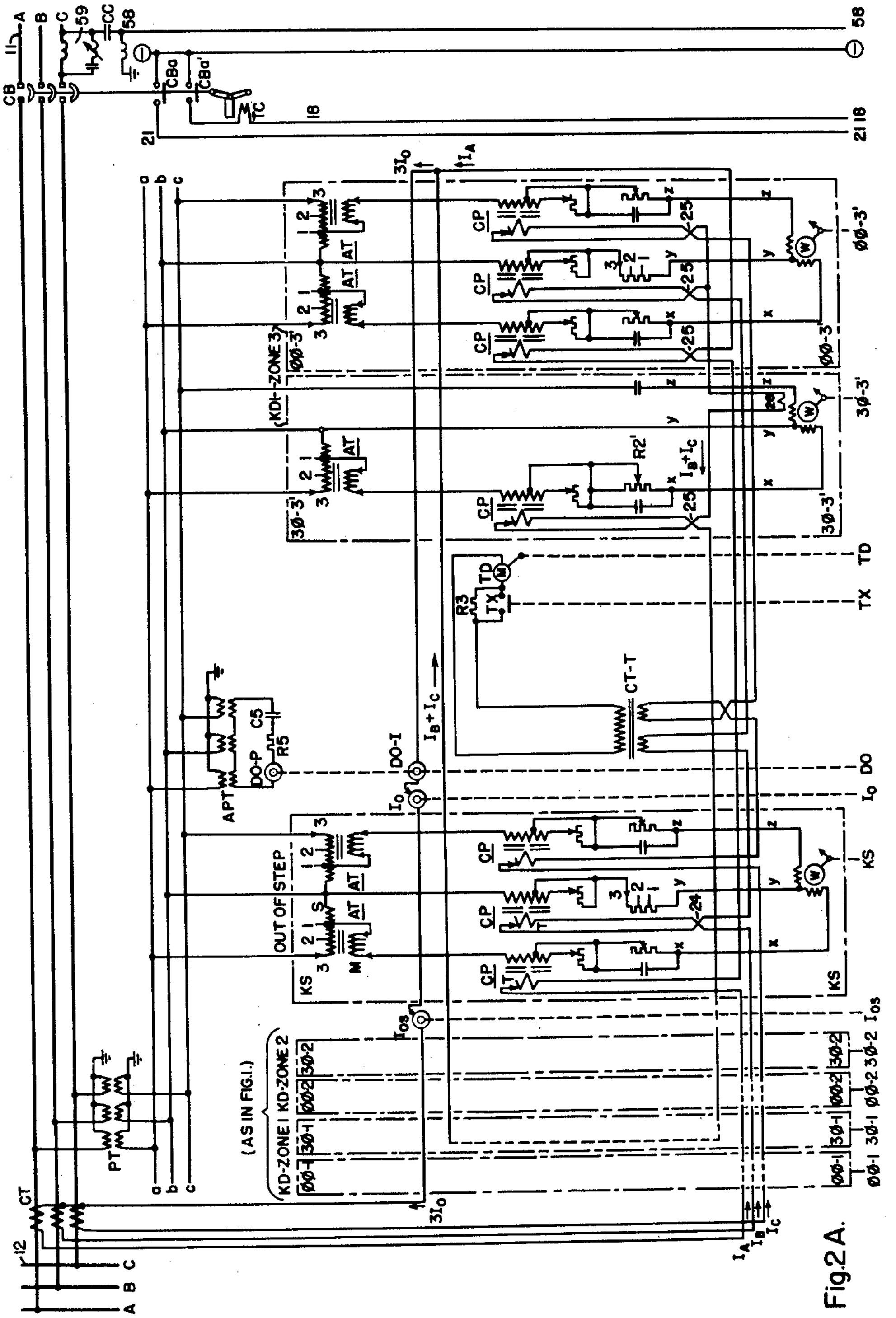
Figure 2B:
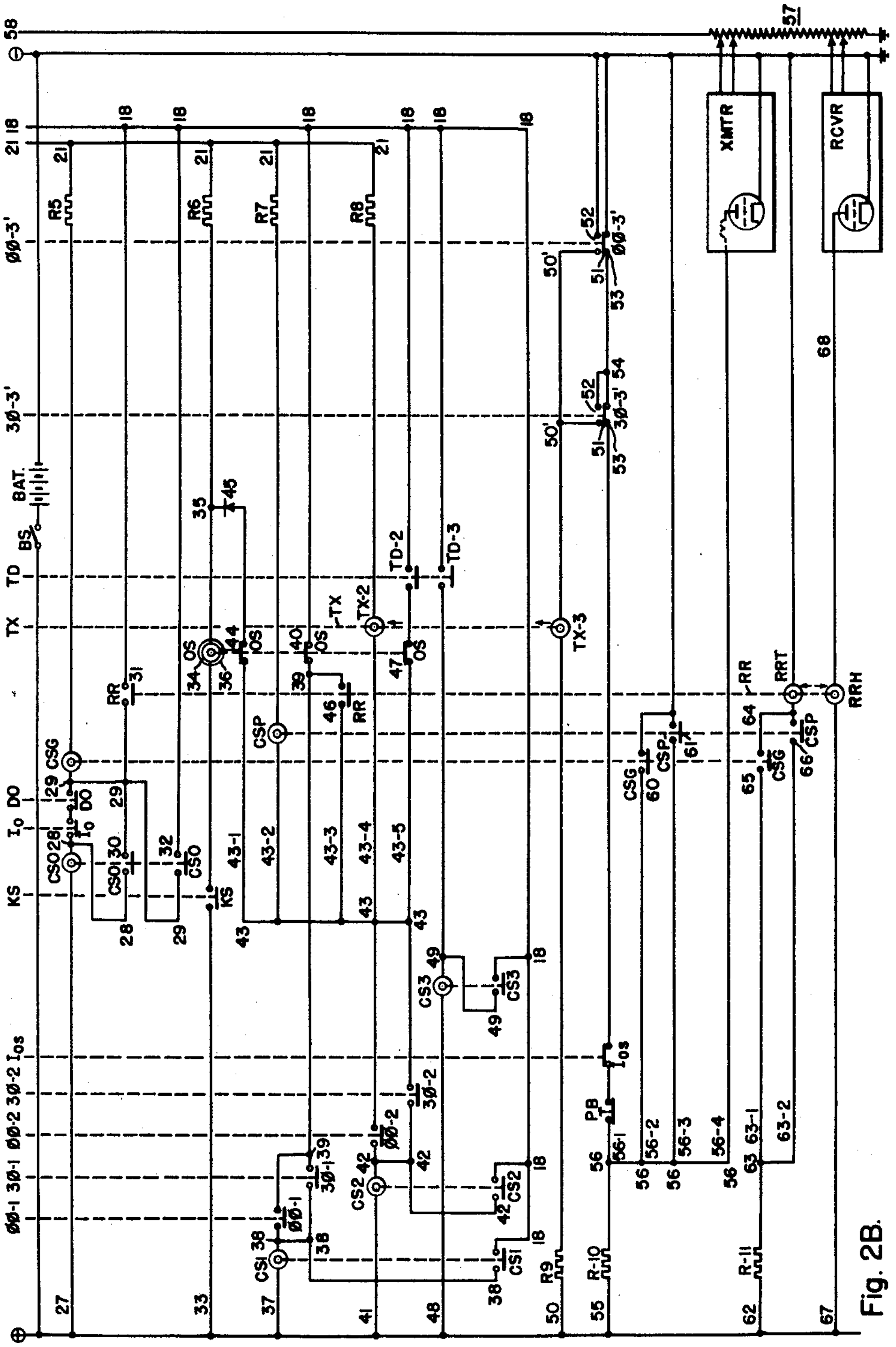

In Fig. 1 the primary windings of the transformer CT—T are energized from separate current transformers CTA energized by the line currents $I_B$ and $I_C$. In Figs. 2A and 2B these primary windings are energized from the current transformers CT.

As shown near the middle of Fig. 2A, the neutral wire of the current-transformers CT, which carries the current $3I_O$, is shown as energizing three coils which have previously been known for the purpose of incorporating single-phase ground-fault protection in a carrier-current system, these three coils being the operating-coil $I_{OS}$ of a sensitive, carrier-starting, ground-fault relay $I_{OS}$, the operating-coil $I_O$ of a somewhat less sensitive (but still very sensitive) ground-fault detector $I_O$, and the current-coil DO–I of a ground-fault directional element DO. This ground-fault directional element DO is also provided with a polarizing coil DO–P, which is shown as being energized, through a phase-shifting impedance including a resistor R5 and a capacitor C5, from the open-delta secondary circuit of a set of auxiliary potential-transformers APT, which are energized from the relaying-voltage bus *abc*.

The equipment shown in Fig. 2A also includes an out-of-step relaying-unit KS, of a compensated-voltage type which is shown and described in an application of S. L. Goldsborough and J. G. Chevlier, Serial No. 685,278, filed September 20, 1957. This relay KS is a three-phase fault-responsive relay, having a reach or balance-point which is sufficiently farther out, away from the relaying station, so that, in the event of a phase-swing of the transmission-system toward an out-of-step condition, the out-of-step relay KS will pick up, some three or four cycles (or other convenient time) sooner than the second-zone three-phase fault-responsive element 3φ–2.

The out-of-step relay KS of Fig. 2A is somewhat like the third-zone phase-fault relay φφ–3 of Fig. 1, except that one of the three compensators CP is reversed, as indicated at 24 in the connections to the primary winding T. In Fig. 2A, this reversed compensator CP is shown as the one which is connected in series with phase *b* of the potential-bus *abc*. If the impedance of this reversed compensator is exactly 0.5 times the impedance of the other two compensators in this relay-unit, the relay will have a zero response to a three-phase fault which occurs precisely at the relaying bus, or more accurately, precisely at the current-transformers CT, and the relay will have a positive response to three-phase faults which occur in front of the bus, and a negative response (which means, no response at all), to three-phase faults which occur behind the bus.

It is usually desirable, however, to make the impedance of the reversed compensator CP more than 0.5 times the impedance of the other two compensators CP in the out-of-step relay KS, so that the relay will respond to three-phase faults at the bus, and will keep on responding for faults located a certain distance back of the bus (or a certain rearwardly reaching distance measured in a direction opposite to the predetermined balance point in the so-called "forward" reach of the relay). The "rearward" reach is dependent upon the amount by which the imepdance of the reversed comepnsator exceeds 0.5 times the impedance of each of the other two compensators. If the reversed compensator is set for an impedance which is, say, 0.55 times that of either of the other two compensators, the backward reach of this relay-element will be only a small amount, and this is theoretically sufficient. However, in actual practice, a larger amount of backward reach would ordinarily be used. It may be convenient to use a reversed compensator having the same impedance as the two unreversed compensators, in this out-of-step relay KS, in which case, however, the rearward reach will be considerably less than the forward reach.

The essential qualification of the out-of-step relay KS is that its backward reach will be sufficient to keep the response-circle of this relay far enough outside of the response-circle of the second-zone three-phase relay 3φ–2 so that a line-swing toward an out-of-step condition picks up the KS relay, on the outer circle, a sufficient time before the system-swing reaches the inner circle.

The forward reach of this relay KS, in response to three-phase faults, is determined solely by the setting of the two unreversed compensators CP. When I speak of three-phase faults, I refer to line-conditions which look, to the relay, like a three-phase fault, as in an out-of-step swing, as is well understood.

In the carrier-current system of Figs. 2A and 2B, the third-zone relaying elements 3φ–3′ and φφ–3′ which respond to faults involving more than one line-conductor, are connected in such polarity as to reach backwardly, rather than forwardly, in a manner which has been customary since the Goldsborough Patent 2,386,209, granted October 9, 1945. Consequently, the carrier-current relaying-equipment which is shown in Figs. 2A and 2B includes a backward-looking third-zone three-phase element 3φ–3′, and a backward-looking third-zone phase-fault element φφ–3′, which differ from the elements 3φ–3 and φφ–3 of Fig. 1 in that the excitations of the primary coils of all four of their compensators are reversed, as shown at 25.

There are also other differences, in the backwardly looking third-zone three-phase relay-element 3φ–3′ of Fig. 2A: the adjustable choke coil X1 of the corresponding third-zone forwardly looking element 3φ–3 of Fig. 1 has been omitted in Fig. 2A, as being unnecessary; the capacitor-shunting resistor R2′ has been made adjustable to provide the impedance-angle-matching function which could previously be accomplished by the adjustable choke coil X1; and the stator windings of the torque-element W of the reversed third-zone three-phase element 3φ–3′ of Fig. 2A have been modified by the addition of a single-turn current-energized winding 26, which is located so as to provide a flux in the poles which are energized by the uncompensated voltage-phase *yz*. This current-energized winding 26 is energized by the same current which affords the compensation for the winding *xy* of this torque-producing element. This current-energized winding 26 enables the backwardly looking three-phase element 3φ–3′ in Fig. 2A to respond to a three-phase fault at the bus, because, under such circumstances, the torque-producing element has two out-of-phase fluxes, one due to the compensator impedance-drop, and the other due to the current $(I_B+I_C)$ or $-(I_A-3I_O)$. This auxiliary current-energized coil or winding 26 has no effect upon the relay-performance except for faults which are very close to the bus. It is described and claimed in the aforesaid Goldsborough application Serial No. 685,168.

The direct-current relaying circuits of the carrier-current relaying equipment of Figs. 2A and 2B are shown in Fig. 2B.

At the top of Fig. 2B, a battery BAT is shown as energizing the positive and negative buses (+) and (−) through a battery-switch BS.

Next, in Fig. 2B, is shown a circuit 27, which extends from the positive bus (+) through the operating coil of a contactor-switch CSO to a circuit 28, and thence through the ground-current relay-contact $I_O$ and the ground-directional relay-contact DO to a circuit 29, from which point a circuit continues on, through the operating coil of a ground-fault contactor-switch CSG, and a resistance R5, to the previously mentioned circuit 21 which extends up through the auxiliary make-contact CB*a* of the circuit breaker CB, and thence to the negative bus (−). The serially connected relay-contacts $I_O$ and DO are bypassed by a make-contact 30 of the contactor-switch CSO. The conductor 29 is also used to energize the tripping circuit 18 through a make-contact 31 of a carrier-current receiver-relay RR, which will be subsequently described. The contactor-switch CSO does not pick up, on the light currents which are used for energizing the CSG relay, but when the receiver-relay contact 31 closes, energizing the tripping-circuit 18, a heavy current is drawn by the trip coil TC, thus causing the contactor-switch CSO to pick up. The contactor-switch CSO thereupon picks up, and closes not only its previously mentioned make-contact 30, but also a second make-contact 32, this last-mentioned make-contact 32 being used to complete a branch-circuit connection between the points 29 and 18.

Next, Fig. 2B shows a circuit 33, which extends from the positive bus (+) through the make-contact KS of the out-of-step relay KS, and thence through the operating-coil 34 of a delayed auxiliary out-of-step relay OS, to a circuit 35, and thence through a resistance R6 to the previously mentioned conductor 21 which extends to the negative bus through the circuit-breaker make-contact CB*a*. The auxiliary out-of-step relay OS is a delayed relay, which is provided with a slug or short-circuited winding 36 in such position as to make this relay a little slow in picking up.

Reference will next be made, in Fig. 2B, to a circuit 37, which extends from the positive bus (+), through the operating-winding CS1 of the contactor-switch CS1 to a circuit 38, and thence through the make-contact $\phi\phi$–1 of the first-zone phase-fault relay $\phi\phi$–1 to a circuit 39, and thence through a back-contact 40 of the auxiliary out-of-step relay OS to the trip-circuit 18. A branch-circuit also extends from the conductor 38 to the conductor 39, through the make-contact 3$\phi$–1 of the first-zone three-phase relay 3$\phi$–1. A third branch-circuit extends from the conductor 38 to the tripping-circuit 18, through the contactor-switch make-contact CS1.

Reference will next be made, in Fig. 2B, to a circuit 41, which extends from the positive bus (+) through the operating-coil of the contactor-switch CS2 to a circuit 42. Two parallel branch-circuits extend on, from the conductor 42 to a conductor 43, one of these branch-circuits including the contact $\phi\phi$–2 of the second-zone phase-fault relay $\phi\phi$–2, while the other branch-circuit includes the contact 3$\phi$–2 of the second-zone three-phase relay 3$\phi$–2. A third branch-circuit extends from the conductor 42 to the tripping-circuit 18, through the contactor-switch contact CS2.

The circuit 43 is thus energized in response to any second-zone fault which involves more than one line conductor, that is, when either of the second-zone relays $\phi\phi$–2 or 3$\phi$–2 responds. This second-zone fault-responsive circuit 43 has five branching extensions 43–1 through 43–5. The circuit 43–1 extends through a back-contact 44 of the auxiliary out-of-step relay OS, and thence through a forwardly conducting rectifier 45 to the previously mentioned circuit 35. The rectifier 45 thus pulls up the potential of the circuit 35 practically to that of the positive bus (+), thus short-circuiting (and de-energizing) the operating-coil OS, whenever there is a response of either one of the second-zone relays $\phi\phi$–2 or 3$\phi$–2.

The branch-circuit 43–2 energizes the operating-coil CSP of a phase-fault contactor-switch CSP, in a circuit which extends through a resistance R7 to the previously mentioned circuit 21; the branch-circuit 43–3 extends to the previously mentioned conductor 39 through a make-contact 46 of the previously mentioned receiver-relay RR; the branch-circuit 43–4 extends through the second-zone operating-coil TX–2 of the auxiliary timer-relay TX, and thence through a resistor R8 to the circuit 21; and the branch-circuit 43–5 extends through a back-contact 47 of the auxiliary out-of-step relay OS, and then through the second-zone contact TD–2 of the timer TD to the trip-circuit 18.

Fig. 2B next shows a circuit 48, which extends from the positive bus (+) through the operating-coil of the contactor-switch CS3 to a circuit 49, and thence through the third-zone timer-contact TD–3 to the tripping-circuit 18. A bypassing circuit-connection is also supplied from the conductor 49 to the tripping-circuit 18 through the contactor-switch make-contact CS3.

As previously explained, the invention is particularly directed to transmission-line-protection systems employing carrier current. Circuits embodying the invention for controlling the production and stopping of carrier current now will be described.

In Fig. 2B, the circuit 50 extends from the positive bus (+) through a resistor R9 to the third-zone operating-coil TX–3 of the auxiliary timer-relay TX, and thence to a circuit 50′.

Each of the two backwardly looking third-zone elements 3$\phi$–3′ and $\phi\phi$–3′ is provided with a make-break contact-assembly having a single moving contact 51, which is common to both a make-contact 52 and a break or back-contact 53. The make-contact 52 of the phase-fault element $\phi\phi$–3′ is connected between the negative circuit 50′ of the auxiliary-timer-relay coil TX–3 and the negative bus (−). The back-contact 53 of this same phase-fault element $\phi\phi$–3′ is connected between a circuit 54 and the negative bus (−). The make-contact 52 of the three-phase fault-responsive element 3$\phi$–3′ is connected between the aforesaid circuit 50′ and the circuit 54. In this way, if there is an operation of the backwardly looking third-zone phase-fault relay $\phi\phi$–3′, it will disconnect the circuit 54 from the negative bus, and it will connect the circuit 50′ to the negative bus, thus energizing the third-zone operating coil TX–3 of the auxiliary timer-relay TX, which starts the timer TD. If the backwardly looking third-zone phase-fault relay $\phi\phi$–3′ does not operate, but if the backwardly looking third-zone three-phase relay 3$\phi$–3′ operates, then such operation will connect the circuit 50′ to the negative bus (−) through the circuit 54 and the back-contact 53 of the phase-fault relay $\phi\phi$–3′, thus again energizing the third-zone operating-coil TX–3 of the auxiliary timer-relay TX.

The next circuit shown in Fig. 2B is a carrier-starting circuit 55, which extends from the positive bus (+) through a resistor R–10 to a carrier-starting circuit 56, which, if it is not shorted over to the negative bus (−), will energize the positive circuit 56–4 of a carrier-current transmitter XMTR, which is diagrammatically illustrated as being coupled to a carrier-current autotransformer 57, which is connected to a circuit 58, which extends up through Fig. 2A, to a coupling-capacitor CC which is connected on the line-side of a carrier-frequency trap 59 which is shown as being connected in phase C of the protected line 11.

Three branch-circuits 56–1 to 56–3 are shown, whereby the transmission of carrier current by the transmitter XMTR may be prevented by connecting the circuit 56 over to the negative bus (−), thereby bringing down the potential of this circuit to that of the negative bus. The branch-circuit 56–1 is connected to the negative bus through a normally closed carrier-testing pushbutton PB, the back-contact $I_{OS}$ of the carrier-starting ground-fault relay $I_{OS}$, the back-contact 53 of the backwardly looking third-zone three-phase relay 3$\phi$–3′, the circuit 54, and the back-contact 53 of the relay $\phi\phi$–3′. Thus, carrier-transmission is permitted if the pushbutton PB is depressed for testing purposes, or if there is a fault-responsive operation of any one or more of the three relays $I_{OS}$, 3$\phi$–3′, or $\phi\phi$–3′.

The branch-circuit 56–2 is connected to the negative bus (−) through a make-contact 60 of the ground-fault contactor-switch CSG, so as to make sure that the carrier is off whenever the relays $I_O$ and DO, in the circuit 28—29 indicate the presence of a ground-fault in a forwardly looking direction, which requires a tripping operation.

The branch circuit 56–3 is connected to the negative bus (−) through a make-contact 61 of the phase-fault contactor-switch CSP, which responds when there is a second-zone fault involving more than one line-conductor, in a forwardly looking direction.

The last two circuits of Fig. 2B are conventional circuits which are common in carrier-current relaying. Thus, the circuit 62 connects the positive bus (+) through a resistor R–11 to a circuit 63, which is connected on, through two parallel branch-circuits 63–1 and 63–2, to a circuit 64, which energizes the operating or tripping-coil RRT of the receiver-relay RR. The first branch-circuit 63–1 includes a make-contact 65 of the ground-fault contactor-switch CSG, while the second branch-circuit 63–2 contains a make-contact 66 of the phase-fault contactor-switch CSP.

The last circuit 67 in Fig. 2B connects the positive bus (+) through a holding or restraining-coil RRH of the receiver-relay RR, and thence to the positive circuit 68 of a carrier-current receiver RCVR which is diagrammatically shown as being coupled to the carrier-current autotransformer 57.

As previously explained, my invention is of particular value in controlling the starting and stopping of carrier current generation and in controlling the measurement of a timing interval. In order to describe the invention in greater detail, a portion of Fig. 2B is reproduced in Fig. 8 in somewhat different form and with parts added.

Figure 8:
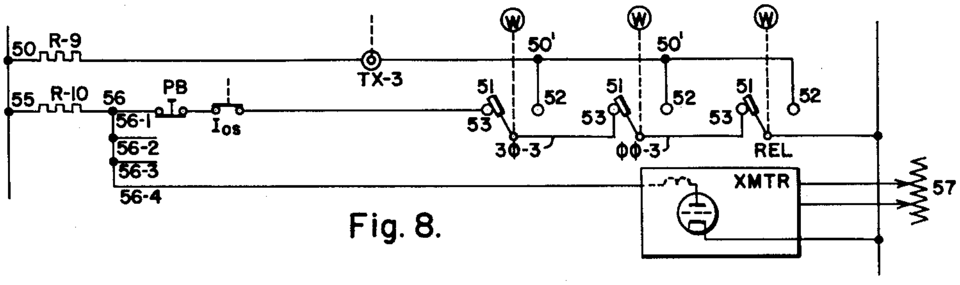
Fig. 8 is a diagrammatic view of a portion of Fig. 2B with additions.

In Fig. 8 the contacts 51, 52 and 53 of the relays 3φ–3′ and φφ–3′ are reproduced in different form to illustrate the simplicity of the construction thereof. It will be noted that a single moving contact 51 is mounted for pivotal movement about an axis between a make contact 52 and a break or back contact 53. The need for only a single moving contact greatly simplifies the construction of the relay and is particularly desirable for sensitive relays of the type herein employed.

It will be noted further that an additional relay REL is illustrated in Fig. 8 and this relay may be of a construction similar to that employed for the relays 3φ–3′ and φφ–3′. With these exceptions, the circuits employed in Fig. 8 are identical to those illustrated in Fig. 2B which are identified by the same reference characters. As long as the moving contact 51 engages the break or back contact 53 of the relay REL, the circuits of Fig. 8 operate in precisely the same manner as those of Fig. 2B. For the present, it will be assumed that the contacts 51 and 53 of the relay REL remain permanently in engagement with each other.

By inspection of Fig. 8 it will be noted that the moving contact 51 and the break or back contact 53 of each of the relays 3φ–3′, φφ–3′ and REL constitutes a first pair of contacts. These pairs of contacts, together with additional pairs of contacts which are intended to control the generation of carrier current by the transmitter XMTR, are connected in a series circuit across the transmitter. In the persent case, the series circuit includes the normally-closed carrier testing push button PB and the contact $I_{OS}$ of the carrier starting ground fault relay $I_{OS}$. Consequently, the opening of any of the pairs of contacts initiates the generation of carrier current by the transmitter XMTR.

As shown in Fig. 8 the three make contacts 52 are all connected to one terminal of the third-zone operating coil TX3 of the auxiliary-timer-relay TX. The remaining terminal of the coil is connected to the positive bus through the resistor R9. Consequently, operation of any of the relays 3φ–3′, φφ–3′ and REL results in energization of the coil TX3 to initiate measurement of a timing interval. However, since the push button PB and the back contacts $I_{OS}$ cannot affect the energizing circuit for the coil TX3, it follows that operation of the push button or of the ground fault relay $I_{OS}$ starts the production of carrier current without initiating measurement of a timing interval. Thus, a selective control of the coil TX3 and of the transmitter is provided.

It should be noted further that operation of any of the relays or of the push button located in the series circuit connected across the transmitter controls precisely the same circuit to initiate generation of carrier current. Thus, operation of the push button PB has precisely the same effect on circuits associated with the transmitter XMTR as operation of any of the relays. Consequently, an operation of the push button PB to test the transmitter XMTR results in a complete test of all circuits required to initiate starting of carrier current generation. This is highly desirable.

Although the invention is particularly suitable for the relay system illustrated in Figs. 1, 2A and 2B, it is possible to add further relays for control purposes. Thus, the relay REL is illustrated in Fig. 8 to indicate how an additional relay may be added to the system. If desired, the movable contacts 51 of the three relays in Fig. 8 and the associated contacts 53 may represent break or back contacts operated by other relays such as relays similar to the relays Z3A, Z3B and Z3C of my Patent 2,519,258 which issued August 15, 1950. If additional back or break contacts or switches are to control the transmitter, but not the coil TX3, such contacts or switches may be included in the series circuit between the push button PB and the break or back contacts $I_{OS}$.

In all of the relaying-units in which the torque-producing element is shown as a two-phase wattmeter-type element W, which is energized from two different voltages of a compensated three-phase voltage-supply *xyz*, the essential thing about the torque-producing element W is that it shall be a polyphase-responsive element which develops an operating force when its impressed voltages have a negative sequence of phases, or which develops an operating force which is responsive to the magnitude of the negative-sequence component of the compensated three-phase relaying voltages, and a restraining force which is similarly responsive to the magnitude of the positive-sequence component of said compensated relaying voltages; or that the torque-producing element W shall produce an operating torque when the negative-sequence component is larger than the positive-sequence component of the compensated relaying voltages, while producing a negative or non-operating torque when the positive-sequence component is the larger or that the torque-producing element W shall be any torque-producing element operating on the principle of a polyphase (two-phase or three-phase, or the like) induction motor (having balanced or unbalanced polyphase windings), energized from said compensated three-phase relaying voltages *xyz*, and having a starting-torque corresponding to $(\bar{E}_1^2-\bar{E}_2^2)$, where $\bar{E}_1$ and $\bar{E}_2$ are the respective scalar values of the positive and negative-sequence voltages, such a motor being used as a relay to respond to the negative starting-torque, in the direction of rotation of the negative-sequence voltage-vector $E_2$; or that the torque-producing element W, if it is energized from a system of delta-connected voltages, shall be responsive to the area of the delta-triangle and to the order of phase-sequence or succession of the phases in the delta-triangle; or that the torque-producing element W, if it is a two-phase element, shall develop an operating force which is responsive to the product of the magnitudes of the two relay-voltages, multiplied by the sine of the phase-angle between them. Any relaying device, electromechanical, static, or otherwise, which will serve to close an electrical circuit sufficiently to trip a circuit breaker whenever the negative-sequence voltage is greater than the positive-sequence voltage, will do the job within the broad concept of the invention.

When the polyphase torque-producing element W is balanced, in all phases of a symmetrical polyphase set of phases, it will not respond to the zero-sequence voltage-component, even though such a voltage-component is present in the impressed voltages. When, however, the circuits of the polyphase torque-producing element W are not balanced, it is quite desirable to keep zero-sequence currents out of said element, either by keeping the zero-sequence voltage-component out of the polyphase voltages which are impressed upon the torque-producing element, or by making the connections in such a way that there is no return-path for any flow of zero-sequence current in any phase-winding of the element; thus preventing the possibility of a shifting of the balance-point of the element as a result of hybrid torques involving the product of the zero and positive-sequence components, or the product of the zero and negative-sequence components.

A cylinder-type multipolar relay-element W may be employed which has four poles, with two diametrically flowing fluxes, in accordance with the broad principles described and claimed in the Sonnemann Patent 2,380,197, granted July 10, 1945, using a light-weight conducting cylinder as the torque-producing rotor-member. Such an element has the advantage of compactness, an extremely low rotor-inertia and hence a high speed of response, and freedom from the pulsating double-frequency torques which interfere with the sensitivity of certain other kinds of wattmeter-type relays. It is to be noted, however, that the four-pole cylinder-type relay-element has only two energizing-circuits, whereas, to serve in my compensator relaying-system, it must be energized from a three-phase compensated bus-voltage, in such a manner as to respond only when the negative-sequence voltage is larger in magnitude than the positive-sequence voltage. This requires special circuit-connections for satisfactorily energizing a two-winding torque-producing element W from a source of three-phase voltages.

When these connections are made, however, using a line-current-energized compensator or compensators for compensating the polyphase bus-voltage, with the proper compensator-impedance to produce a zero relay-torque at a desired balance-point, such a combination has the very distinct advantage of completely avoiding the necessity for using directional relays in responding to faults involving more than one line-conductor. The positive and negative-sequence components of the compensated polyphase relay-voltages are equal, for faults at the balance-point, while the positive-sequence component prevails for faults which are even very slightly beyond the balance-point, and the negative-sequence component prevails for faults which are even very slightly nearer than the balance point. Thus the balance-point of such a combination may be set, and maintain, very accurately, more so than has heretofore been possible. Such a combination also has an advantage in responding to faults near the relaying-station bus, because the line-currents, which energize the compensators, are in one direction when the fault is in front of the line-current transformers, and in the other direction when the fault is behind the line-current transformers.

Figure 3:
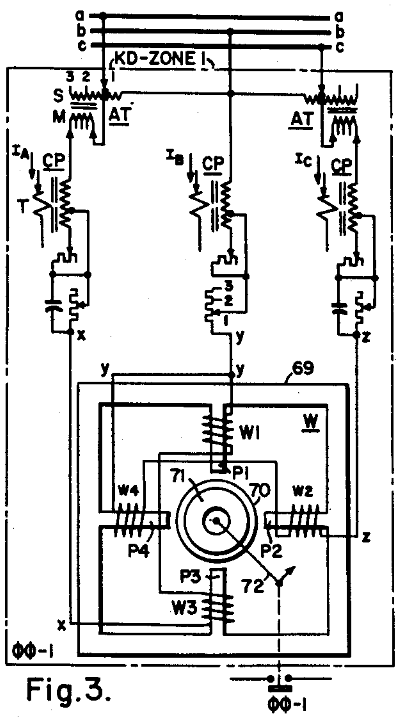
Fig. 3 is a diagrammatic detail of the first-zone phase-fault element $\phi\phi$–1 of Fig. 1, showing the use of a four-pole cylinder-type torque-producing element.

Fig. 3 shows a detail of one of the phase-to-phase relay-elements, illustrating the first-zone element $\phi\phi$–1 of Fig. 1, by way of example. Fig. 3 differs from the representation of the $\phi\phi$–1 element in Fig. 1, by diagrammatically showing a detail of the wattmetric, or torque-producing, element W.

In Fig. 3, this torque-producing element W is diagrammatically shown, in its preferred form of embodiment, as a four-pole cylinder-type element, comprising a stationary magnetizable frame 69 having four salient poles P1, P2, P3 and P4, carrying windings W1 to W4, respectively. Inside of the four poles there is a light-weight, rotatably mounted cylinders 70 of aluminum or other conducting material in which eddy currents are induced for producing a rotational torque tending to rotate the cylinder in one direction or the other, according to the predominance of the positive or negative phase-sequence component of the currents in the windings W1 to W4. Inside of the cylinder 70, there is usually mounted a stationary cylindrical magnetizable member 71 for providing a return-path for the flux from one pole to another, thus making the flux as large as possible, and consequently increasing the available torque. Since the relay-element W operates on alternating current, its stationary magnetizable members 69 and 71 are preferably of laminated materials, while the cylindrical rotor-element 70 is preferably made of a light-weight non-magnetizable conducting material. An operating-arm 72 is attached to the rotor-cylinder 70, for actuating the contact-member $\phi\phi$–1 when the element W responds.

Figures 4, 5, 6, 7:
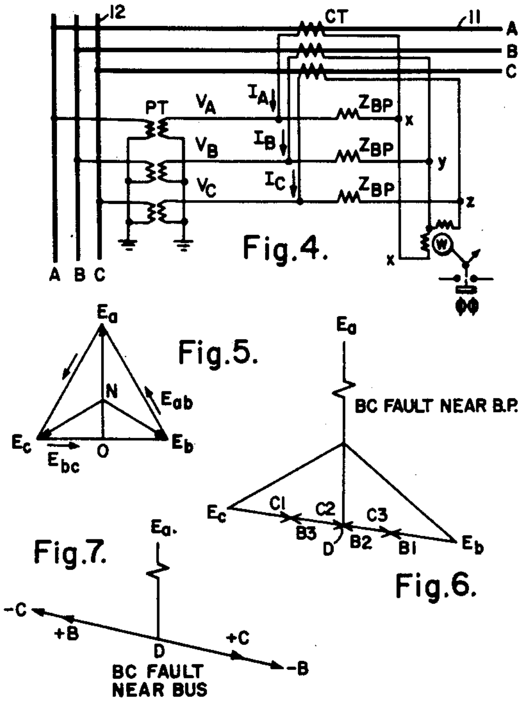
Fig. 4 is a very much simplified diagrammatic view showing my phase-fault element, in a form which is useful in explaining some of its basic principles.
Figs. 5, 6 and 7 are vector diagrams which will be referred to in the description of the operation of Fig. 4.

The general basic principles on which my phase-fault element operates are illustrated more simply in Fig. 4, wherein the torque-producing element W is more diagrammatically indicated. In this figure, the potential transformers PT reproduce the bus-voltages $V_A$, $V_B$, $V_C$, which are connected to the relay-terminals *xyz* through three equal impedances $Z_{BP}$, each of which is a replica of the positive-sequence line-impedance of the power-line 11, out to the desired balance-point of the relay. In Fig. 4, three separate line-current transformers CT are shown, for circulating the three line-currents $I_A$, $I_B$ and $I_C$ through the respective impedances $Z_{BP}$ which are connected in series with the respective bus-voltages $V_A$, $V_B$ and $V_C$. This is an equivalent simple diagrammatic representation of the compensator-connections of the phase-to-phase relays $\phi\phi$.

The operation of the phase-fault relay of Fig. 4 will be explained with the aid of the vector-diagrams in Figs. 5, 6 and 7. Fig. 5 shows an equilateral triangle $E_aE_bE_c$, which represents the balanced three-phase line-voltages or bus-voltages at the relaying station when there is no fault on the system. The delta line-voltages are shown as the sides of the triangle, as indicated by the arrows $E_{ab}$, $E_{bc}$, and $E_{ca}$. In any problem dealing with line-impedances, it must be remembered that the line-impedances are the impedances of individual line-wires, and hence they are line-to-neutral impedances, and not delta impedances. In like manner, the line-currents $I_A$, $I_B$ and $I_C$, to which reference has been made, in other figures, are line-to-neutral or star-currents. Therefore, in any problem in which line-impedances are involved, and specifically in connection with my compensator relaying system in which line-current-energized compensators are involved, it is necessary to use, in the calculations, the line-to-neutral or star voltages, as indicated in Fig. 5 at $NE_a$, $NE_b$ and $NE_c$.

The phase-fault relay, as basically shown in Fig. 4, is designed to respond when the negative-sequence component of the compensated bus-voltages *xyz* is larger than the positive-sequence component. The voltage-drops in the compensator-impedances $Z_{BP}$ of Fig. 4 are subtracted from the line-to-neutral bus-voltages $V_A$, $V_B$ and $V_C$ of the relaying circuits, which may be regarded as reflecting the line-to-neutral voltages $E_a$, $E_b$ and $E_c$ of the actual line 11, or bus 12, which are shown in Figs. 5 and 6.

Since the phase-fault relay, with three identical compensators, develops an operating torque only in response to the negative-sequence component of the compensated voltages *xyz*, this relay does not respond to three-phase faults which do not have any negative-sequence current-components. The phase-fault relay is intended to respond to faults involving any pair of the line-conductors A, B and C, whether the faults involve ground-currents or not.

Since the compensator-connections are balanced, that is, the same in each phase, it is possible to adopt the usual convention, which is usual in non-compensated cases, of denominating the faulted phases as B and C, in a line-to-line fault.

When a BC fault occurs on the power-line 11, if the fault is ungrounded, as is commonly indicated by the designation BC, it will collapse the delta-line-voltage $E_{bc}$ practically to zero, at the fault. At the relaying station, as indicated in Fig. 6, the delta bus-voltage $E_{bc}$, or $(E_b-E_c)$, will be only partially collapsed, depending upon the line-drops due to the line-currents flowing in the faulted-phases B and C. There will also be a voltage-triangle distortion at the bus, resulting in a shortening and a phase-shifting of the delta bus-voltage $E_{bc}$, as shown in Fig. 6, due to the flow of the unbalanced fault-current in the source-impedance back of the bus.

If a BC fault occurs exactly at the balance-point of my phase-fault relay, it will be noted that the voltage-drops in my compensators in phases B and C will exactly match the voltage-drops in the line-impedances in these two phases, up to the point of fault. As shown in Fig. 6, the compensators in phases B and C will subtract, from the bus-voltages $E_b$ and $E_c$, respectively, the compensator-drops ($E_b$, B2) and ($E_c$, C2), where the points B2 and C2 coincide with the mid-point D in the line $E_bE_c$.

If the BC fault in Fig. 6 should be further away than the desired balance-point of the relay, the portion of the fault-current which is supplied from the relay-station bus 12 will be smaller, because of the greater line-impedance up to this more distant fault-location, and hence the line-currents will be smaller, in the faulted phases B and C, and the voltage-triangle of the compensated voltages *xyz* which are impressed upon the torque-producing element will not be collapsed to a straight line $E_aD$, but will be a positive-sequence triangle ($E_a$, B1, C1). Thus, the torque-producing element will be energized with a three-phase voltage having the positive phase-sequence, and hence the element will not respond.

If, however, the BC fault in Fig. 6 should be closer than the balance-point of the phase-fault element $\phi\phi$ of Fig. 4, the line-currents which are supplied by the current transformers CT of Fig. 4 will be larger than they would be for a fault at the balance-point, and hence the voltage drops ($E_b$, B3) and ($E_c$, C3) in Fig. 6, will extend beyond the median point D, resulting in a negative-sequence relay-voltage triangle ($E_a$, C3, B3), in which the negative-sequence succession of phases prevails, and hence the relay will respond to all faults which are even a tiny bit closer to the relaying station than the balance-point of the relay. It is to be observed that this discrimination between line-to-line faults which are at or beyond the balance-point, and line-to-line faults which are closer than the balance-point, is obtained by a single relay, regardless of the pair of line-phases which are involved in the fault.

Fig. 7 shows how the phase-fault relay $\phi\phi$ of Fig. 4 responds to a BC faults which is either at the bus or very close to the bus, (in front of the bus or behind the bus). When a BC fault occurs at or very close to the bus, the delta bus-voltage $V_{bc}$ will collapse essentially to a single point D, as shown in Fig. 7, so that the voltage-triangle at the bus at the relaying station will become a single line $E_aD$, representing a single-phase voltage. If such a voltage were applied to a polyphase-responsive torque-producing element, without any compensator-action, the element would fail to respond. In the compensator relaying system, however, the phase-fault element $\phi\phi$ of Fig. 4 uses compensators which are the same in all three phases, so that the torque-producing element will be energized from an uncollapsed three-phase compensated-voltage triangle. It makes a difference whether the fault-currents are positive or negative. If the fault is in front of the current-transformer CT, the fault-currents which are supplied to the compensators may be regarded as positive; but if the fault is behind the current-transformers, the line-currents which are supplied by the current transformers will be reversed, and can be regarded as negative currents.

Thus, in Fig. 7, if the compensators receive positive currents, for a BC fault immediately in front of the current transformers CT of Fig. 4, the voltage-drop in the compensator in phase B will be (D, +B). In like manner, the compensator in phase C, when receiving a positive current, for a BC fault immediately in front of the current transformers CT of Fig. 4, will produce, in Fig. 7, a compensator-voltage (D, +C). Thus, for a BC fault immediately in front of the bus, (or more exactly, immediately in front of the current transformers CT), the compensated three-phase voltages which are used to energize the torque-producing element of the phase-fault relay $\phi\phi$ will have a negative phase-sequence, such as ($E_a$, +C, +B) in Fig. 7, and the torque-element will accordingly respond strongly. If, however, the BC fault had been behind the bus, (or, more properly, back of the current-transformers CT), the compensator-drops or voltages will be reversed, as indicated by the minus signs in Fig. 7, and the compensated three-phase voltages *xyz* which are used to excite the torque-element will have a positive phase-sequence, or succession of phases, as indicated at ($E_a$, −B, −C), and the torque-producing element will be pressed tightly back against its back-stop.

Figure 9:
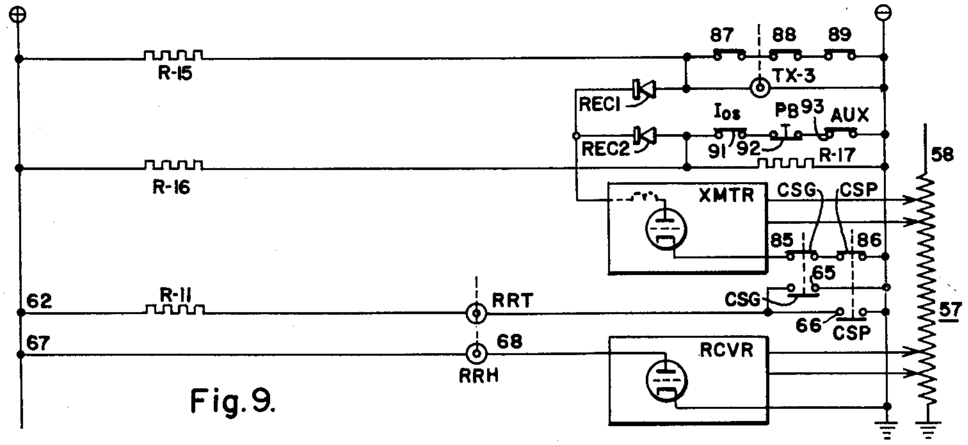
Fig. 9 is a diagrammatic view showing circuits and apparatus illustrating a modified embodiment of the invention.

Although the system thus far described in detail illustrates a preferred embodiment of the invention, some of the principles of my invention may be employed in other systems, one of which is illustrated in Fig. 9. Referring to Fig. 9, the lower two circuits 62 and 67 are reproductions of the circuits identified by the same reference characters which appear in Fig. 2B and which have been previously described. It will be recalled that the circuit 62 is employed for controlling the operating or tripping-coil RRT of the receiver-relay RR, whereas the circuit 67 controls the holding or restraining coil RRH of the receiver-relay RR and the carrier-current receiver RCVR. Input terminals of the receiver are again shown as connected to the carrier-current autotransformer 57. Energy for the various circuits of Fig. 9 are obtained from direct current buses identified by the polarity markings (+) and (−).

The transmitter XMTR of Fig. 9 is similar to that illustrated in Fig. 2B, but it is controlled somewhat differently. The control for the transmitter illustrated in Fig. 9 now will be described.

Break or back contacts 85 and 86 of the ground-fault contactor-switch CSG and the phase-fault contactor switch CSP, respectively, are connected in series between the cathode of one of the tubes of the transmitter, such as the oscillator tube and the negative bus. Consequently, opening of either of the contacts 85 or 86 makes certain that the carrier is off, regardless of the condition of other relays in the system.

If the contacts 85 and 86 are closed, the production of carrier current by the transmitter XMTR is determined by the voltage appearing across the third-zone operating coil TX–3 of the auxiliary timer-relay TX or by the voltage appearing across a resistor R17. The transmitter is connected across the operating coil TX–3 through a rectifier REC1 and is connected across the resistor R17 through a rectifier REC2. These rectifiers are unilaterally conducting rectifiers and are poled to permit current to flow therethrough in the directions of their associated arrows. If desired, a filter (not shown) may be interposed between the rectifiers and the transmitter to provide smooth plate current for the transmitter.

The operating coil TX–3 is connected in series with a resistor R15 across the buses (+) and (−). Consequently, these components operate as a voltage divider to apply to the transmitter that portion of the bus voltage which appears across the operating coil TX–3. In a similar manner, the resistor R17 is connected in series with a resistor R16 across the bushings. As representative of suitable parameters, the resistors R15 and R16 each has a resistance of the order of 1,000 ohms, whereas the operating coil TX–3 and the resistor R17 each has a resistance of the order of 4,000 ohms for a voltage of the order of 125 volts between the buses.

The effectiveness of the operating coil TX3 to apply a voltage to the transmitter XMTR is controlled by a plurality of break or back contacts 87, 88 and 89 connected in series across the operating coil. Consequently, as long as these contacts are all closed, the voltage across the operating coil TX3 is insufficient to produce a carrier output from the transmtiter XMTR. Also, it should be noted that if all of the contacts are closed, the voltage applied to the operating coil TX3 is insufficient to pick up the auxiliary timer relay TX and consequently cannot initiate the starting of a timing interval.

If any of the contacts 87, 88 or 89 open, sufficient voltage appears across the operating coil TX3 to operate the coil to pick up the auxiliary timer relay TX and thus initiate the measurement of a timing interval. In addition, the voltage is sufficient to cause the transmitter XMTR to produce carrier current.

The contacts 87, 88 and 89 may represent any contacts which are intended to control the simultaneous operation of the timer relay TX and the transmitter XMTR. For example, the break contacts 87 may represent break contacts of the third-zone element $3\phi-3'$, whereas the break contacts 88 may represent break contacts of the third-zone element $\phi\phi-3'$. In this case, operation of either of these third-zone elements simultaneously would operate the auxiliary timer relay TX to initiate measurement of a timing interval and would initiate production of carrier current by the transmitter XMTR. Alternatively, the break contacts 87, 88 and 89 may represent break contacts of conventional third-zone elements such as the elements Z3A, Z3B and Z3C, respectively, of my Patent No. 2,519,258 which issued August 15, 1950.

The resistor R17 has connected in series thereacross break contacts of all elements which are intended to control the production of carrier current only. These contacts in Fig. 9 are represented by break contacts 91, 92 and 93. As illustrative of suitable contacts, the contacts 91 may represent break contacts $I_{OS}$ of the carrier-starting ground-fault relay $I_{OS}$. The contacts 92 may represent normally closed carrier-current-testing push button PB. The contacts 93 represent any auxiliary contacts which may be desired for control purposes.

It should be noted that the two rectifiers REC1 and REC2 are oppositely poled between the resistor R17 and the operating coil TX3. For this reason, no interference can occur between the elements controlling the voltage across the operating coil TX3 and the elements controlling the voltage across the resistor R17.

With the system of Fig. 9, a single movable contact suffices for each element controlling the voltage across the operating coil TX3. This greatly simplifies the design of a relay intended for such control. Furthermore, since the control is effected by opening contacts, it is not affected by bounce or vibration of the contacts.

In the preceding description of the fault-responsive units, such as the phase-to-phase unit $\phi\phi-1$ in Fig. 1, I have stated that the effective impedance of certain compensators is equal to the line-impedance to a fault at the desired balance point. This statement really presupposes that the line has a single impedance, which is the same in all three of the line-conductors A, B and C, which is true of a well-constructed balanced transmission-line in which there is adequate transportation of the phase-wires. In the case of a non-transposed transmission-line, the reactance parts of the impedances of the three line-wires will not all be the same, and it must be understood, in such a case, that each such compensator could be set to match the impedance of its own line-wire. I wish my description to be read with this explanation in mind.

In the preceding description of the coincidence of the phase-angle of the compensator voltage-drop with the phase-angle of the voltage to which the compensator voltage-drop is being added or subtracted, I have really been assuming the general case in which the impedance of the fault itself is negligibly small, so that the voltage between the faulted phases is zero at the fault.

While I have illustrated my invention in several different forms of embodiment, and while I have explained the general principles of its design and operation in the best form and manner at present visualized, I wish it to be understood that the foregoing illustration, description and explanations are only by way of example, and were not intended as limitations, in the sense that it is possible to substitute various equivalents, or to add certain additional refinements, or to omit certain of the illustrated refinements which may not be needed in any particular case, without departing from the essential spirit of my invention.

I claim as my invention:

1. In a protective-relaying combination for responding to certain faults on an electrical system, carrier-generation means controllable for generating and terminating the generation of an alternating carrier quantity, timing means controllable for measuring a timing interval, first circuit-controlling means operable in response to predetermined conditions between a circuit-completing condition and a circuit-interrupting condition, second circuit-controlling means operable between a circuit-completing condition and a circuit interrupting condition, first circuit means responsive to operation of the first circuit-controlling means from a circuit-completing condition to a circuit-interrupting condition for controlling the carrier-generation means from a non-generating condition to a generating condition and for controlling the timing means to initiate measurement of a timing interval, and second circuit means responsive to operation of the second circuit-controlling means for controlling the carrier-generation means from a non-generating condition to a generating condition, said second circuit means being ineffective for controlling the timing means.

2. In a circuit-controlling combination; a plurality of circuit-controlling means each including a first contact, a second contact spaced from the first contact and a third contact operable relative to the first and second contacts from engagement with one of the contacts into engagement with the other of the contacts, the first and third contacts constituting a first pair of contacts and the second and third contacts constituting a second pair of contacts; a third pair of contacts operable between circuit opening and circuit closing conditions; first translating means, a source of energy having first and second terminals, a first circuit including each of said first pairs of contacts and the third pair of contacts in series between said terminals for controlling the energizing of the first translating means from said source, each of the third contacts being positioned between its associated first contact and the first terminal, second translating means having third and fourth energizing terminals, and circuit means connecting each of the second contacts to the third terminal of the second translating means; whereby engagement of any of the second pairs of contacts assures completion of a circuit through the second translating means between the first and fourth terminals.

3. In a protective-relaying combination for responding to certain faults on an electrical system, carrier-generation means controllable for generating and terminating the generation of an alternating carrier quantity, timing means controllable for measuring a timing interval having first and second energizing terminals; a plurality of protective relays each including a first contact, a second contact spaced from the first contact and a third contact operable relative to the first and second contacts from engagement with one of the contacts into engagement with the other of the contacts in response to a predetermined fault condition on the electrical system, the first and third contacts constituting a first pair of contacts and the second and third contacts constituting a second pair of contacts; a third pair of contacts operable between circuit opening and circuit closing conditions; a source of energy having third and fourth terminals, a first circuit including each of said first pairs of contacts and the third pair of contacts in series between said third and fourth terminals effectively in shunt with the carrier-generation means for energizing the carrier-generation means when any of said first pairs of contacts or said third pair of contacts are in circuit-interrupting condition, each of the third contacts being positioned between its associated first contact and the third terminal, circuit means connecting each of the second contacts to the first energizing terminal of the timing means, and means for connecting a source of energy between the second and third terminals whereby engagement of any of the second pairs of contacts assure completion of a timing circuit for the timing means.

4. In a protective-relaying combination for responding to certain faults on an electrical system, carrier-generation means controllable for generating and terminating the generation of an alternating carrier quantity, timing means controllable for measuring a timing interval, a plurality of relays each having back contacts, first and second rectifiers, first circuit means connecting the back contacts effectively in shunt across the carrier-generation means through the first rectifier, said circuit means connecting the back contacts effectively in shunt across the timing means, whereby opening of any of the back contacts initiates carrier generation by the carrier-generation means and initiates measurement of a timing interval by the timing means, second circuit means including normally closed contacts connected effectively in shunt across said carrier-generation means through the second rectifier, whereby opening of the second circuit means initiates carrier generation by the carrier-generation means, said rectifiers being oppositely poled between the first and second circuit means whereby the second circuit means does not control the timing means.

5. In an electrical system, an electrical circuit for transmitting electric power from a first station to a second station spaced from the first station, and a protective-relaying combination for responding to certain faults on the electrical system comprising carrier-generation means controllable for generating and terminating the generation of an alternating carrier quantity for transmission from the first to the second station, timing means controllable for measuring a timing interval, first circuit-controlling means operable in response to predetermined fault conditions of the electrical system between a circuit-completing condition and a circuit-interrupting condition, second circuit-controlling means operable between a circuit-completing condition and a circuit interrupting condition, first circuit means responsive to operation of the first circuit-controlling means from a circuit-completing condition to a circuit-interrupting condition for controlling the carrier-generation means from a non-generating condition to a generating condition and for controlling the timing means to initiate measurement of a timing interval, second circuit means responsive to operation of the second circuit-controlling means for controlling the carrier-generation means from a non-generating condition to a generating condition, said second circuit means being ineffective for controlling the timing means, and auxiliary relay means responsive to expiration of the timing interval for further protecting said electrical system.

6. In an electrical system, an electrical circuit for transmitting electric power from a first station to a second station, a circuit-controlling combination comprising a protective-relaying combination for responding to certain faults on the electrical system comprising carrier-generation means controllable for generating and terminating the generation of an alternating carrier quantity for transmission from the first to the second station, timing means controllable for measuring a timing interval having first and second energizing terminals; a plurality of protective relays, each including a first contact, a second contact spaced from the first contact and a third contact operable relative to the first and second contacts from engagement with one of the contacts into engagement with the other of the contacts in response to a predetermined fault condition on the electrical system, the first and third contacts constituting a first pair of contacts and the second and third contacts constituting a second pair of contacts; a third pair of contacts operable between circuit opening and circuit closing conditions; a source of energy having third and fourth terminals, a first circuit including each of said first pairs of contacts and the third pair of contacts in series between said third and fourth terminals effectively in shunt with the carrier-generation means for energizing the carrier-generation means when any of said first pairs of contacts or said third pair of contacts are in circuit-interrupting condition, each of the third contacts being positioned between its associated first contact and the third terminal, circuit means connecting each of the second contacts to the first energizing terminal of the timing means, means for connecting a source of energy between the second and third terminals whereby engagement of any of the second pairs of contacts assure completion of a timing circuit for the timing means, and auxiliary relay means responsive to measurement of said interval for protecting said electrical system against predetermined faults.

References Cited in the file of this patent

UNITED STATES PATENTS

| | | |
|---|---|---|
| 2,454,163 | Harder | Nov. 16, 1948 |
| 2,508,198 | Sonnemann | May 16, 1950 |